No. 11,962. Reissued Jan. 21, 1902.

E. T. FREEMAN.

NAILING MACHINE.

(Application filed Apr. 14, 1900.)

4 Sheets—Sheet 1.

Witnesses.
Thomas J. Drummond.
Edward F. Allen.

Inventor.
Edwin T. Freeman,
by Crosby & Gregory. Atty's.

THE NORRIS PETERS CO., PHOTO-LITHO., WASHINGTON, D. C.

No. 11,962. Reissued Jan. 21, 1902.

E. T. FREEMAN.

NAILING MACHINE.

(Application filed Apr. 14, 1900.)

4 Sheets—Sheet 2.

Witnesses.
Thomas J. Drummond.
Edward F. Allen.

Inventor
Edwin T. Freeman,
by Crosby & Gregory
Atty's.

THE NORRIS PETERS CO., PHOTO-LITHO., WASHINGTON, D. C.

No. 11,962. Reissued Jan. 21, 1902.
E. T. FREEMAN.
NAILING MACHINE.
(Application filed Apr. 14, 1900.)
4 Sheets—Sheet 3.
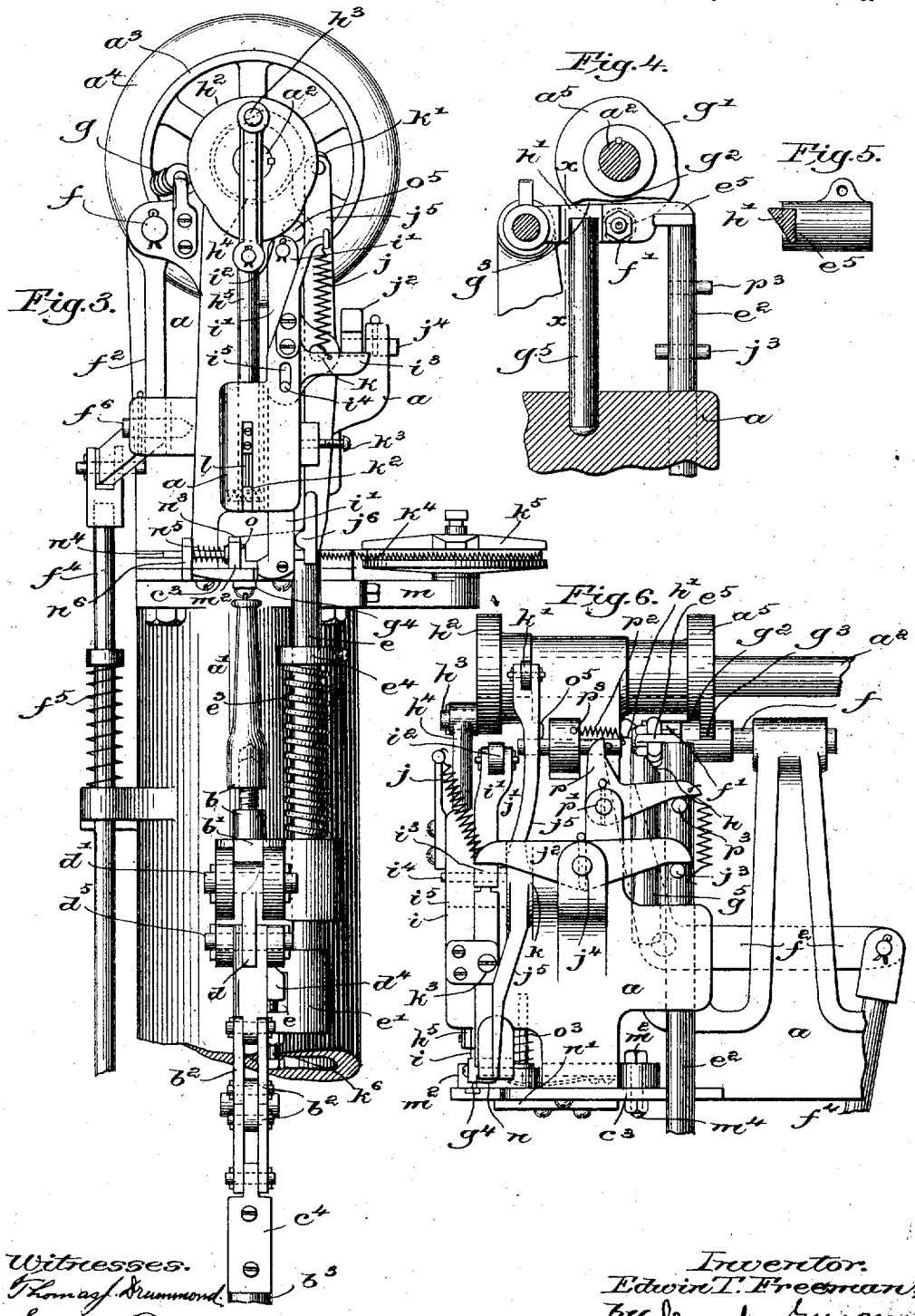
Witnesses.
Thomas J. Drummond.
Edward F. Allen.
Inventor.
Edwin T. Freeman,
by Crosby & Gregory
Attys.
THE NORRIS PETERS CO., PHOTO-LITHO., WASHINGTON, D. C.

No. 11.962. Reissued Jan. 21, 1902.

E. T. FREEMAN.

NAILING MACHINE.

(Application filed Apr. 14, 1900.)

4 Sheets—Sheet 4.

Witnesses.
Thomas J. Drummond
Edward F. Allen.

Inventor.
Edwin T. Freeman,
by Crosby & Gregory Attys.

THE NORRIS PETERS CO., PHOTO-LITHO., WASHINGTON, D. C.

UNITED STATES PATENT OFFICE.

EDWIN T. FREEMAN, OF BOSTON, MASSACHUSETTS, ASSIGNOR TO THE UNITED SHOE MACHINERY COMPANY, OF PATERSON, NEW JERSEY, A CORPORATION OF NEW JERSEY.

NAILING-MACHINE.

SPECIFICATION forming part of Reissued Letters Patent No. 11,962, dated January 21, 1902.

Original No. 618,082, dated January 24, 1899. Application for reissue filed April 14, 1900. Serial No. 12,948.

*To all whom it may concern:*

Be it known that I, EDWIN T. FREEMAN, of Boston, in the county of Suffolk and State of Massachusetts, have invented an Improvement in Nailing-Machines, of which the following description, in connection with the accompanying drawings, is a specification, like letters on the drawings representing like parts.

The object of my invention is to produce a practical machine simpler in construction than machines of this class in use and one which permits stock to be placed on the stock-support or removed from it without stopping the rotation of the driving-shaft, thus less liable to get out of repair or to be worn out, as the machines will not be given the shock by the starting and stopping of the same.

An important feature of my invention consists of an improved mechanism to operate the stock-support.

My invention further consists of mechanism or devices connected with the mechanism which automatically lowers the stock-support, whereby nails are prevented from being driven and the awl held in its extreme upper or inoperative position independent of the rotation of the driving-shaft, while the stock-support is lowered to permit the placing or removal of the stock.

Other features consist of my improved means to feed a nail-strip and to sever nails therefrom.

Figure 1:
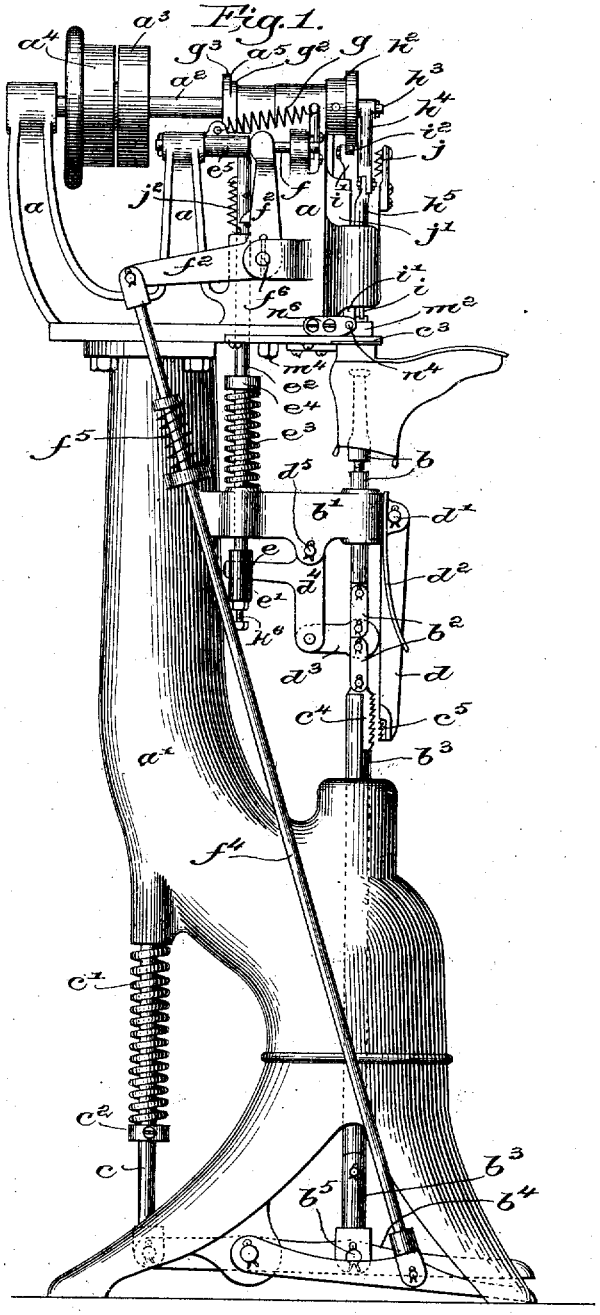
Figure 2:
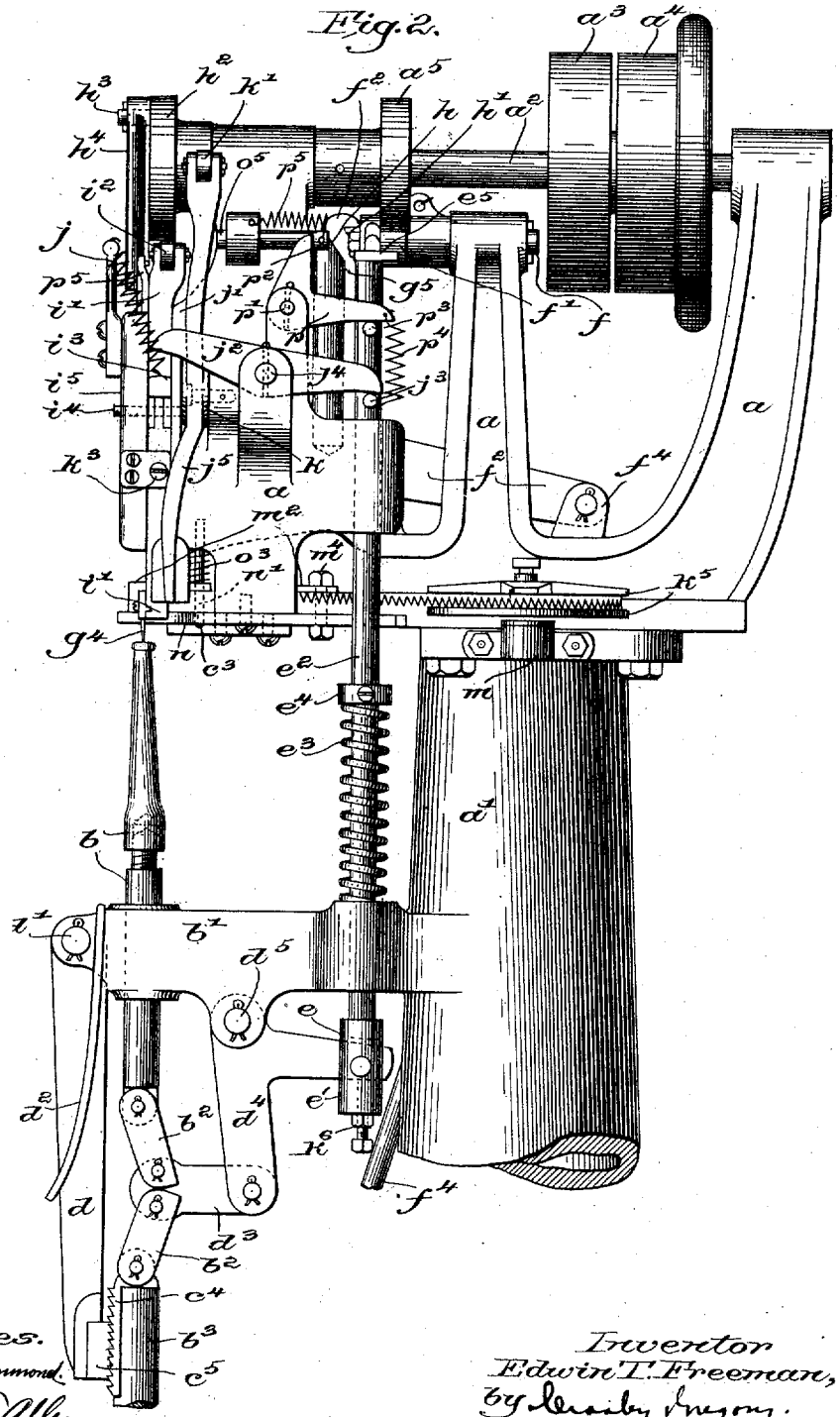
Figure 7:
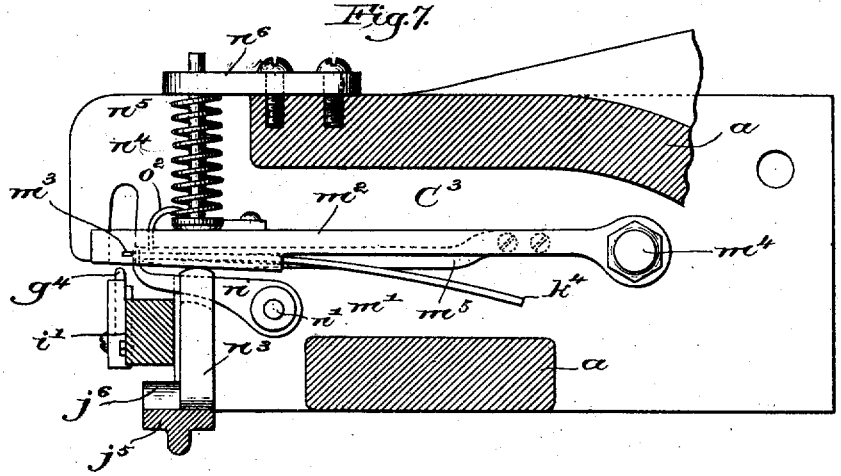
Figure 8:
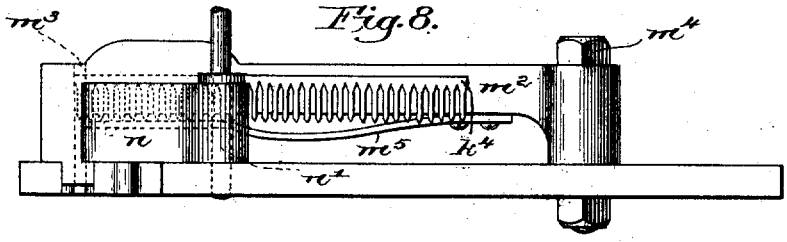
Figure 9:
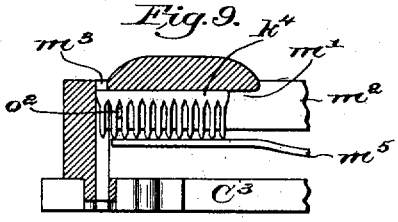
Figure 10:
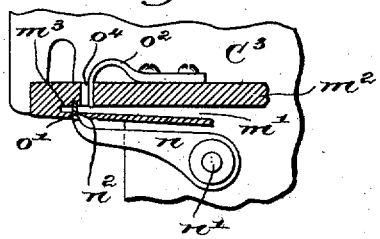
Figure 11:
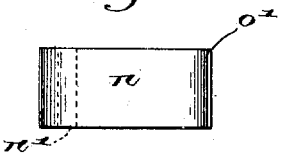
Figure 12:
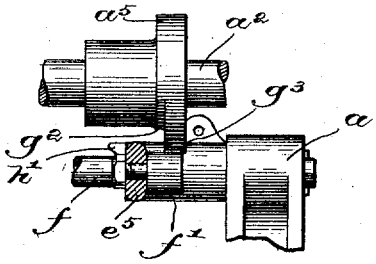

Figure 1 in the accompanying drawings is a side elevation of a machine embodying my invention. Fig. 2 is a side elevation of the opposite side of the machine, showing the lower part of the standard broken off and the parts of the machine as in their position when the stock-support is lowered to permit the feeding of the stock. Fig. 3 is a front elevation of Fig. 2. Fig. 4 is a front view of the cam and lever which operate the stock-support and other mechanism, the lever being shown in its extreme upper position and its cam-roller in dotted lines. Fig. 5 is a section of the lever on line X and X in Fig. 4. Fig. 6 is a side elevation of the front part of the head of the machine, showing the position of the working parts when the stock-support is lowered to permit the placing or removal of the stock. Fig. 7 is a top view of the work-plate and of mechanism attached to it and of other mechanism, partly in section. Fig. 8 is a side view of the work-plate and of mechanism attached to it. Fig. 9 is a sectional side view of the front part of the raceway. Fig. 10 is a top view of the cutter and a sectional view of the front end of the raceway. Fig. 11 is a side view of the cutter, showing the cutting edge. Fig. 12 is a side view of the cam and lever shown in Fig. 4, the lever being shown in section and in its extreme lower position.

Like letters of reference indicate corresponding parts of the different figures of the drawings.

The frame $a$ of the machine is firmly secured to the standard $a'$, both being shaped to support working parts of the machine. Within bearings in the frame $a$ is mounted the driving-shaft $a^2$. The driving-shaft carries a loose pulley $a^3$ and a driving-pulley $a^4$. The driving-shaft also carries a cam $a^5$, which actuates the stock-support and other mechanism, which will hereinafter be described.

The stock-support $b$ is shown in the accompanying drawings as a straight horn; but it can be made in any other suitable shape. A part $b'$ projects from the standard or can otherwise be secured to it and has a bearing in which the stock-supporting horn is held from sidewise movement, but in which it is capable of vertical movements. Below said bearing toggles $b^2$ are attached to the horn $b$ and to the upper end of a support or shaft $b^3$, which shaft is also capable of vertical movements and guided in a bearing or bearings in the standard and has its lower end attached to a treadle $b^4$ by a stud $b^5$. A rod $c$ is attached to the treadle $b^4$ back of the stud $b^5$ and has its upper end loosely extending into a bearing. A coil-spring $c'$ surrounds the rod $c$ between the bearing and a collar $c^2$, the tendency of this spring being to force the rod downward, and consequently to force the horn $b$ upward, thereby pressing the stock when placed on the horn between the horn and a work-plate $c^3$. This work-plate is stationary, attached to the under side of the frame $a$.

The horn $b$ is lowered and raised by the toggles $b^2$, which are operated by a horizontal link or bar $d^3$, which bar has one end pivotally attached to the toggles and the other end to the lower end of a bell-crank lever $d^4$. This bell-crank lever is hung on a stud $d^5$ and has one end extending through a perforation $e$, which is formed in a block $e'$. This block is carried by a vertically-movable rod $e^2$ and gives the bell-crank lever an oscillating motion by being moved up and down by the rod $e^2$. The bar $d^3$ is given a reciprocating motion by the bell-crank lever, and when moved toward the standard in the upward movement of the rod $e^2$ forces the toggles $b^2$ out of a straight line with the horn $b$, and consequently the horn will be lowered. When the horn $b$ is lowered by the toggles, it is released from the influence of the spring $c'$ and is locked in its lowered position by a locking device consisting of a ratchet-block $c^4$, secured to the shaft $b^3$ of the work-support, and a part $c^5$, secured to the lower end of a bar $d$. This bar $d$ is loosely hung on a stud $d'$ between ears projecting from the part $b'$ and is forced by a spring $d^2$ toward the shaft $b^3$; but when the toggles are in a straight line with the horn the bar $d$ is forced against the front end of the bar $d^3$ and the ratchet $c^5$ will be held from coming in contact with the other ratchet and the horn will be free to be moved up and down; but in the first part of the movement, whereby the toggles are moved out of a straight line, the bar $d$ is moved by the spring $d^2$ and the two parts of the ratchet-lock will come in contact, whereby the shaft $b^3$ will be held in the position it had before the horn was lowered. It will be seen that when the toggles are straightened by the bar $d^3$ when moved forward by the bell-crank lever $d^4$ the bar $d$ is moved from the shaft $b^3$ and the ratchet $c^5$ will be moved out of contact with the other ratchet.

The extent of the movement of the bell-crank lever $d^4$ is adjusted by a set-screw $k^6$, which is screwed through the block $e'$ and into the perforation $e$ and comes in contact with the bell-crank lever when the rod $e^2$ is moved upward. If the bell-crank lever is held against the upper side of the perforation by the set-screw $k^6$, it is given its greatest swing, and consequently the horn $b$ will be lowered its greatest distance.

A coil-spring $e^3$ surrounds the rod $e^2$, the tendency of which being to force the rod upward; but the block $e'$ prevents the rod from being moved upward a greater distance than desired, as the block is adjusted to come against one of the bearings of the rod when coming to its extreme upper position. One end of a lever $e^5$ rests on the upper end of the rod $e^2$, on which it can be slid, and the other end is hung on a stud $f$, on which the lever can be both oscillated and slid, and the lever has a cam-roller $f'$ between the rod $e^2$ and the stud $f$ and directly under the driving-shaft. A bell-crank lever $f^2$, which is hung on a stud $f^6$ and connected with a treadle $f^3$ by a rod $f^4$, has its upper end arranged to move the lever $e^5$ toward the cam $a^5$ when the treadle $f^3$ is depressed. A coil-spring $f^5$, which surrounds the rod $f^4$, tends to hold the treadle and rod in their elevated positions, and another spring $g$, which is attached to the lever $e^5$ and to a stationary part of the frame $a$, tends to move the lever from the cam $a^5$, and thereby also to hold the lever in contact with the bell-crank lever $f^2$.

The cam $a^5$ proper extends below the upper side of the cam-roller $f'$ when the roller is not operated by the cam; but the cam has an operating part $g^2$ of its periphery which comes above the cam-roller when passing the roller and which extends partly through the thickness of the cam only and from the side toward the cam-roller $f'$. Thus the other part $g^3$ of the thickness of the cam forms a wall to the part $g^2$. The periphery of the cam $a^5$ has another operating part $g'$, which extends through the entire width of periphery and which does not come above the cam-roller when the roller is not acted upon. When the lever $e^5$ is moved toward the cam $a^5$, as described, the outer end of the cam-roller $f'$ is in the first part of the movement pressed against the side of the cam $a^5$; but without being operated upon before the part $g^2$ comes to the roller, when the roller is permitted to be moved under the cam and against the part $g^3$. It will be noticed if the part $g^2$ passes the cam-roller when the lever is moved toward the cam the cam-roller will be moved under the cam without coming against the side of the cam. After the cam-roller is moved under the cam the latter portion of the part $g^2$ gradually depresses the cam-roller $f'$, whereby the lever $e^5$ and the rod $e^2$ are depressed against the influence of the spring $e^3$. After the parts $g^2$ and $g^3$ have passed the cam-roller the lever $e^5$ is free to be moved farther in the same direction till the treadle $f^3$ has reached its extreme lower position. The part $g^2$ will in the following rotations of the cam pass the cam-roller without coming in contact with the roller, as the outer end of the roller will move on the part $g^3$ when passing the part $g^2$, and consequently the roller will not be operated by the part $g^2$. Each time the part $g'$ passes the cam-roller when the roller is operated by the cam the rod $e^2$ is raised by the spring, and the horn will by said connection to the rod be lowered sufficiently to permit the stock to be moved by the awl, which movements are timed to correspond. When the treadle $f^3$ is released, the bell-crank lever $f^2$ is moved from the lever $e^5$, and the lever $e^5$ is moved from the cam $a^5$ by the spring $g$, and thereby withdrawing the cam-roller from the contact with the cam, thus permitting the spring $e^3$ to move the rod $e^2$ upward a greater distance than when moved upward periodically when the part $g'$ passes the cam-roller $f'$, and consequently the horn will be lowered a greater distance and sufficiently to permit the stock to be placed upon the horn or removed from it. If it is desired for any reason to lower the horn a greater distance than automatically lowered for permitting the placing of the stock, the front end of the treadle $b^4$ is depressed.

I do not wish herein to limit myself to have the cam $a^5$ by its connection to the stock-support moving the stock-support both periodically and at various times, as the cam can be made to have one operative part only.

When it is desired to stop the machine, the power can be transmitted in any well-known manner from the driving-pulley $a^4$ to the loose pulley $a^3$.

To insure the complete driving of the last nail before the horn is lowered for removal of the stock, I employ a stud $g^5$. This stud is stationary and is secured to the frame $a$ and has the side $h$ inclined toward the lever $e^5$. The part $h'$ of the side of the lever $e^5$ is in line with the stud $g^5$ and is inclined to fit the inclined side of the stud $g^5$. When the lever $e^5$ is in contact with the cam $a^5$ and the treadle $f^3$ is released, the lever $e^5$ is moved along with the bell-crank lever $f^2$ by the spring $g$ until the stud $g^5$ is reached, when the lever is stopped by the stud if part $g^2$ does not at that time pass the cam-roller. When the part $g^2$ of the periphery of the cam reaches the cam-roller, the roller is moved from the wall $g^3$ far enough to roll on the part $g^2$ without coming in contact with the part $g^3$ and gradually moves upward while the first portion of the part $g^2$ passes it, and the lever $e^5$ will be sliding against the stud $g^5$, and as the lever slides upward against the inclined side of the stud the lever is permitted to be gradually moved from the cam $a^5$. When the lever reaches its upper position, it is moved far enough from the cam to have withdrawn the cam-roller $f'$ from contact with the cam. In place of this stud $g^5$ any other suitable part having an inclined side can be used without departing from my invention.

A cam $h^2$ is mounted on the front end of the driving-shaft $a^2$ and has a crank-pin $h^3$ on its front side, on which a bar $h^4$ is hung. This bar is attached to the upper end of the driving-bar $h^5$ and gives a reciprocating motion to the driving-bar when the cam $h^2$ is in motion. This driving-bar is guided in a bearing formed in the frame $a$ against sidewise movement and carries the driver $i$ in a well-known manner.

A bar $i'$ extends through a groove which is made in the frame and carries in a well-known manner the awl $g^4$ at its lower end and a cam-roll at its upper end. An arm $i^3$ projects from the bar $i'$, which bar is jointed below the arm, and a pin $i^4$ extends through the joint and into a vertical groove $i^5$ made in the frame $a$, as shown in Fig. 3 and also shown in dotted lines in Figs. 2 and 6. Thus the pin is prevented from sidewise movement, but permitted to be moved up and down by the bar $i'$. Each end of the bar $i'$ is capable of sidewise movement, swinging on the pin $i^4$. The lower end can be moved toward and from the driver $i$ and the upper end toward and from the cam $h^2$. A coil-spring $j$ is attached to the arm $i^3$ and to a stationary part of the frame $a$, the tendency of this spring being to force the bar $i'$ upward and the upper part of the bar against a stationary part $j'$ of the frame $a$, and thereby to hold that part in a vertical position and the cam-roller $i^2$ against the front part of the periphery of the cam $h^2$. The bar $i'$ is periodically depressed by the cam $h^2$ when its cam-roller $i^2$ and the cam are in contact and the cam rotated, whereby the awl is forced to penetrate the stock placed on the horn $b$. At a proper time after the awl has penetrated the stock the cam $h^2$ permits the spring $j$ to move the rod $i'$ upward, whereby the awl is withdrawn from the stock.

A lever $j^2$ is loosely hung on a stud $j^4$ and has one of its ends above the arm $i^3$ and its other end above a pin $j^3$, which pin is secured to the rod $e^2$. When the rod $e^2$ is moved upward, the pin $j^3$ moves the rear end of the lever $j^2$ upward and the front end of the lever will be lowered and come in contact with the outer part of the arm $i^3$ and move it downward, thereby swinging the upper end of the bar $i'$ from the cam $h^2$ and the cam-roller out of contact with the cam, and the bar $i'$ will be held by the spring $j$ in its upper position, with the pin $i^4$ against the upper end of the groove $i^5$ and the awl above the stock. It will be seen that when the bar $i'$ is in this position, as described, it will not be moved vertically by the cam $h^2$. When the rod $e^2$ is moved downward, the lever $j^2$ will loosen its hold on the arm $i^3$, and the cam-roller $i^2$ will again be moved into contact with the cam $h^2$.

A lever $j^5$ is fulcrumed to the frame $a$ at $k$ and carries a cam-roller $k'$ at its upper end and has at its lower end a projection $j^6$, which abuts against the outer side of the lower part of the bar $i'$. The cam-roller $k'$ is held by a yielding pressure, which will hereinafter be described, against the rear part of the periphery of the cam $h^2$. When the awl is forced into the stock, as described, the cam $h^2$ is operating the lever $j^5$ to move the lower end of the bar $i'$ toward the driver, thereby forcing the awl $g^4$ to feed the stock. When the awl has come directly under the driver, the lever $j^5$ is stopped and the awl withdrawn from the stock, leaving the awl-hole in the stock in position for the next nail to be driven into. After the awl is withdrawn from the stock the lower end of the lever $j^5$ is moved from the driver and the lower end of the bar $i'$ is moved from the driver by a coil-spring $k^2$, which is shown in dotted lines in Fig. 3. The feeding of the stock can be adjusted by means of a set-screw $k^3$, which is screwed through a stationary part of the frame $a$ and engages the bar $i'$ to limit the sidewise movement of the awl when moved from the driver.

The comb-shaped nail-strip $k^4$ used in the machine is placed upon a reel $k^5$, which can be made in any suitable shape, but is shown in the accompanying drawings pivotally attached to the bracket $m$. When the nail-strip $k^4$ is conveyed toward the driver, it is guided in a groove $m'$. This groove $m'$ is formed in the raceway $m^2$ and extends from the bottom side and partly through the height of the raceway; but the front part $m^3$ of the groove $m'$ extends through the entire height of the raceway and is directly in line with the driver $i$ when the raceway is in its extreme inner position. This raceway swings at its rear end on a stud $m^4$, and the front end is moved toward and from the driver by means as will hereinafter be described. This raceway is provided with a spring $m^5$ at its under side, which spring holds the nail-strip against the upper side of the groove $m'$.

A cutter $n$ severs the nails one at a time before they are driven into the stock and is also adapted to move the nail-strip forward. This cutter is on one side of the raceway pivotally attached at $n'$ to the work-plate $c^3$. The side of the raceway toward the cutter has a perforation $n^2$, so as to permit the free end of the cutter to be moved into the groove $m'$ between the first and second nails from the front. A projection $n^3$, also on the lower end of the lever $j^5$, butts against the side of the raceway above the cutter $n$ and moves the free end of the raceway from the driver while the projection $j^6$ is moving the bar $i'$ toward the driver. A stud $n^4$, surrounded by a spring $n^5$, abuts against the raceway on the side opposite to the projection $n^3$ and can be moved back and forth in a stationary part $n^6$ of the frame $a$, the tendency of this spring being to force the stud $n^4$ against the raceway, and thereby holding the raceway against the projection $n^3$ and moving the free end of the raceway when the lower end of the lever $j^5$ is moved from the raceway. By pressing the raceway against the projection $n^3$ the cam-roller $k'$ is forced against the cam $h^2$.

When the raceway is moved from the driver, a part $o$ of the projection $n^3$, which part extends below the upper side of the cutter $n$, reaches the cutter before the raceway has come to its outer position and moves the free end of the cutter in the same direction as the free end of the raceway is moved, and as the distance from the part $o$ to where the cutter is pivotally attached to the work-plate is much shorter than the distance from the projection $n^3$ to the stud $m^4$ the free end of the cutter will reach the groove $m'$ and will be moved between the shanks of the first and second nails of the nail-strip before the raceway stops at its outer position, or the cutter can be arranged not to enter between the shanks of the first two nails before being stopped at its outer position, but to come between them in the inward movement of the raceway. When the free end of the raceway is moved toward the driver, the free end of the cutter is moved in the same direction by the raceway and keeps its position between the shanks of said nails, thereby moving the nail-strip forward, as the free end of the cutter is moved forward a greater distance than the free end of the raceway.

When the raceway has come in its position under the driver $i$, the first nail in the groove $m'$ has been moved against the front end of the groove and has come directly under the driver, and the driver has been moved downward by its connections to the crank-pin $h^3$ and enters the front part $m^3$ of the groove $m'$ and forces the nail-strip downward against the influence of the spring $m^5$, and the upper part of the nail-strip comes against the cutting edge $o'$ of the cutter $n$, and as the downward movement of the driver continues the nail engaged by the driver is severed from the nail-strip and driven into the stock placed between the work-plate and the stock-support. After the driver is withdrawn from the raceway by its connection to the crank-pin $h^3$ the raceway and cutter are again moved outward to bring another nail into position to be driven into the stock. A spring $o^3$ is arranged to press on the cutter $n$ to insure the stopping of the cutter.

The nail-strip is prevented from being moved in a direction from the driver by a spring $o^2$, which is attached to the raceway and has its free end extending through a perforation $o^4$ and between the shanks of the two nails and is arranged to yield when the nail-strip is moved forward, but is prevented from yielding in the opposite direction by a side of the aperture $o^4$, as shown in Fig. 10.

When the awl-carrying bar $i$ is moved out of engagement with the cam $h^2$ and the horn is automatically lowered for removal or placing of the stock, the driver continues to move up and down if the power is transmitted to the driving-pulley; but a stud $o^5$ checks the extent of the movement of the lever $j^5$, whereby the raceway $m^2$ will not be moved under the driver $i$, but stopped in its movement toward the driver, so as to permit the driver to pass on one side of the raceway. Consequently no nails will be driven and the nail-strip will not be moved forward, as the free end of the raceway is moved a short distance only. Said stud $o^5$ has its bearing in the frame $a$ and is provided with a head on the end toward the lever $j^5$. When the lever $j^5$ is to complete its full movement, the head of the stud $o^5$ is held against the front side of its bearing by a bell-crank lever $p$ and the lever $j^5$ passes it in its sidewise movement without coming in contact with it. The bell-crank lever $p$ is loosely hung on a stud $p'$ and has its upper end normally placed against a pin $p^2$ and on the side of the pin toward the lever $j^5$. This pin extends from the stud $o^5$. The other end of the bell-crank lever $p$ is placed above a pin $p^3$, which extends from the rod $e^2$. A spring $p^4$ is attached to the rod $e^2$ and to the bell-crank lever $p$, the tendency of which is to hold the bell-crank lever against the pin $p^3$. A spring $p^5$ is attached to the stud $o^5$ and to the frame $a$, the tendency of this spring being to move the stud $o^5$ toward the lever $j^5$. When the rod $e^2$ is moved upward for the purpose of lowering the stock-support for placing or removal of stock, as above set forth, the end of the bell-crank lever $p$ which is above the pin $p^3$ is moved upward by the pin, and the other end is thereby moved toward the lever $j^5$, and the stud $o^5$ will be moved in the same direction by the spring $p^5$ till the head of the stud has passed between the upper part of the lever and the cam $h^2$, when the upper part of the lever is in its outer position. When the stud $o^5$ is in this position, the upper end of the lever $j^5$ is prevented from moving to its extreme inner position and is stopped in an intermediate position, as shown in Fig. 3; but the upper end of this lever will be moved periodically between this intermediate position and its extreme outer position. At the same time the lower end will be moved periodically between an intermediate position and its extreme inner position. Consequently the raceway will not be moved under the driver for the purpose described and the awl will not be moved to its extreme outer position. It will be noticed that while the stud $o^5$ checks the movement of the lever $j^5$ the awl is held in its extreme upper position and is periodically moved sufficiently from the pathway of the driver so as not to obstruct the movement of the driver. When the rod $e^2$ is again depressed, the head of the stud $o^5$ cannot be moved past the lever $j^5$, as the lever $j^5$ at that time of the rotation of the driving-shaft presses against the stud; but when the lever $j^5$ has been moved to its outer position by the cam $h^2$ the stud is free to be moved from the lever by the bell crank lever $p$, which lever is moved in that direction by the spring $p^4$, which is strong enough to overcome the influence of the spring $p^5$. This holding of the lever $j^5$ in its intermediate position after the rod $e^2$ is depressed is to time the lever to become operative at the right point in the cycle of the operations of the machine. When the stock-support is lowered periodically by the raising of the rod $e^2$ to permit the feeding of the stock, the bar $i'$ is in its lower position and will not be acted upon by the lever $j^2$, and the movements of the lever $j^5$ and the periodical forward movement of the stud $o^5$ are so timed that the movement of the lever will not be checked by the periodical movement of the stud.

Having fully described my invention, what I claim, and desire to secure by Letters Patent, is—

1. A machine for inserting metallic fastenings comprising mechanism for inserting fastenings, an awl and awl-bar, an actuator therefor, and means for stopping the operation of the awl without stopping said actuator during repeated operations of the machine.

2. In a nailing-machine, a stock-support, a rotating cam, a connection between said stock-support and said cam, said cam periodically operating said connection to move the stock-support, and means also causing said cam to move said stock-support independently of the periodical movement thereof.

3. In a nailing-machine, a block, a perforation in the block, and means to give the block a reciprocating movement, a bell-crank lever extending into said perforation and thereby given a reciprocating movement by the block, and means to adjust the extent of the movement of the lever, a stock-support, connection between the bell-crank lever and the stock-support, whereby the stock-support is moved.

4. In a nailing-machine, in combination, an awl, and a jointed bar carrying said awl, and means to give one part of said bar a sidewise movement and to give another part of the bar a sidewise movement independent of said movement of the first part.

5. In a nailing-machine, in combination, a rotating cam, an awl-bar, said awl-bar being capable of movement into and out of engagement with the cam, means to move the awl-bar into contact with the cam, and mechanism to move the awl-bar out of contact with the cam and hold it out of such contact during repeated operations of the machine.

6. An awl, means to move the awl sidewise, an actuator, connection between said actuator and the awl, a treadle, and connection between the treadle and said actuator, said actuator being governed by the operation of the treadle to change the extent of operative movement of the awl.

7. A raceway, a groove in the raceway to permit nails formed in a comb-shaped strip to be conveyed therein, a cutter, means to move the cutter between the shanks of adjacent nails of said nail-strip in said groove, means for thereafter moving said cutter and thereby moving said nail-strip, and a reciprocating driver, said driver coöperating with said cutter and severing the nails from said strip.

8. A raceway, a reciprocating driver, means to move the raceway under the driver and away from the driver, said raceway containing a groove adapted to convey a nail-strip, a cutter, means for moving said cutter between adjacent nails of the nail-strip, means to operate the cutter and thereby move the nail-strip, said driver coöperating with the cutter in severing nails and thereafter driving the nails.

9. In a nailing-machine, a raceway, a cutter, and means to operate the cutter to move a strip in the raceway, and other means to move the strip toward and against the cutter thereby forcing the cutter to sever nails from the strip.

10. In a nailing-machine, an awl-bar, a raceway, a nail-moving mechanism, and means to move the awl-bar, said means including means to move the raceway and actuate said nail-moving mechanism.

11. In a nailing-machine, in combination, an awl, and means to carry said awl, a raceway, a device adapted to move nails in said raceway, a lever in contact with and operating said means, raceway and device, for the purpose set forth.

12. In a nailing-machine, in combination, an awl, and means to carry said awl, a raceway, a device, means to operate said device to move nails in said raceway, and the latter means also arranged to move the first means sidewise, for the purpose set forth.

13. In a nailing-machine, in combination, a raceway, an awl, and means to move said raceway and awl sidewise, and means to automatically change the extent of the sidewise movements of said raceway and awl.

14. In a nailing-machine, in combination, a raceway, an awl, and means to move said raceway and awl sidewise, and means to change the extent of the sidewise movements of said raceway, and the latter means also arranged to change the extent of the sidewise movement of said awl.

15. In a nailing-machine, in combination, a raceway, an awl, means to move said raceway and awl, a treadle, mechanism between said treadle and raceway for changing the extent of movement of the awl.

16. In a nailing-machine, a stock-support, an awl, means to move the awl, a cam for moving said stock-support, and connection between the cam and the awl for changing the movement of the awl.

17. In a nailing-machine, a stock-support, a cam for moving said stock-support, an awl, means including said cam for changing the movement of the awl, a raceway, and means including said cam for governing the movement of the raceway.

18. In a nailing-machine, a stock-support, a cam for moving the stock-support, a raceway, means for moving the raceway, and means including said cam for governing the movement of the raceway.

19. A machine for inserting metallic fastenings comprising a driver, actuating mechanism therefor, an awl, a continuously-operating actuator therefor and means to remove said awl from the control of said actuator during repeated operations of the machine.

20. In a nailing-machine, a driver, an awl-bar, means to present fastenings to be driven by said driver, means to render said awl-bar inoperative, and means to prevent the presentation of fastenings to be driven.

21. In a nailing-machine, a raceway, an awl-bar, a driver, means to move said raceway periodically under the driver, and means to prevent such movement without stopping the machine.

22. In a nailing-machine, a raceway, an awl-bar, a driver, means to move said raceway periodically under the driver, means to prevent such movement without stopping the machine, and means to cause said movement again to take place.

23. In a nailing-machine, a stock-support, an awl, a continuously-moving actuator for said stock-support and awl, and means to depress said stock-support, leave it at rest for the removal of the stock and suspend the operation of the awl while its actuator continues in motion.

24. In a machine of the class described, mechanism for inserting fastenings, an awl, an actuator for causing the awl to enter the work, and means arranged to be operated without stopping said actuator for suspending the operation of the awl during repeated operations of said actuator.

25. In a machine of the class described, mechanism for inserting fastenings, an awl, an actuator therefor, mechanism operated by said actuator for causing said awl to enter the work, and means arranged to be operated without stopping said actuator for removing said mechanism from the control of said actuator during repeated operations of said actuator.

26. In a machine of the class described, an awl, means for feeding fastening material, mechanism for actuating the awl and the feeding means, an actuator for operating said mechanism, and means for suspending the operations of the awl and the feeding means while said actuator continues in operation.

27. In a machine for inserting fastenings, an awl, an actuator, mechanism operated by said actuator for causing the awl to enter the stock and for causing the awl to feed the stock, and means for controlling the operation of said mechanism whereby the entering and feeding operations of the awl may be suspended while said actuator continues in operation.

28. In a machine of the class described, mechanism for inserting fastenings, an awl, an actuator therefor, mechanism operated by said actuator for causing said awl to enter the work, means for removing said mechanism from the control of said actuator, and means including a yielding medium arranged to be operated while said actuator is in operation for causing said awl to be returned to the control of its actuator.

29. In a machine of the class described, mechanism for inserting fastenings, an awl, an actuator therefor, means for removing the awl from the control of its actuator, and spring-actuated means arranged to be operated while said actuator is in operation for restoring said awl to the control of the actuator.

30. In a machine for inserting fastenings, an awl, means for feeding fastening material, mechanism for actuating the awl and the feeding means, an actuator for operating said mechanism, means for suspending the operations of the awl and the feeding means while said actuator continues in operation, and means including a yielding medium, arranged to be operated while the actuator is in operation for restoring the awl and the feeding means to the control of the actuator.

31. In a machine for inserting fastenings, a work-support, an awl, an actuator for said awl, and mechanism under the control of the operator for suspending the operation of the awl and for lowering the work-support and leaving it in lowered position while said awl-actuator continues in operation.

32. In a machine for inserting fastenings, a work-support, an awl, an actuator for said awl, mechanism under the control of the operator for suspending the operation of the awl and for lowering the work-support and leaving it in lowered position while said awl-actuator continues in operation, and means for raising the work-support when the awl is again operated.

33. In a machine for inserting fastenings, a work-support, an awl, an actuator for said awl, a driver, mechanism for actuating the driver, and mechanism under the control of the operator for suspending the operation of the awl and for lowering the work-support and leaving it in lowered position while said awl-actuator and the driver continue in operation.

34. In a machine for inserting fastenings, a work-support, an awl, an actuator for said awl, a driver, mechanism for actuating the driver, mechanism under the control of the operator for suspending the operation of the awl and for lowering the work-support and leaving it in lowered position while said awl-actuator and the driver continue in operation, and means for raising the work-support when the awl is again operated.

EDWIN T. FREEMAN.

Witnesses:
NELSON W. HOWARD,
EDWARD H. PALMER.